United States Patent

Ron

[11] 3,837,421
[45] Sept. 24, 1974

[54] PRESSURE PRIORITY VALVE FOR A POWER STEERING AND BRAKE SYSTEM

[76] Inventor: Benjamin Ron, 10 Sanhedrin St., Tel Aviv, Israel

[22] Filed: Dec. 2, 1971

[21] Appl. No.: 204,286

[52] U.S. Cl. ............................. 180/79.2 R, 60/422
[51] Int. Cl. ............................................. B62d 5/06
[58] Field of Search.......... 180/79.2 R; 60/422, 421, 60/420, 405

[56] References Cited
UNITED STATES PATENTS

| | | |
|---|---|---|
| 2,624,361 | 1/1953 | Brown............................ 180/79.2 R |
| 3,050,944 | 8/1962 | Schwartz..................... 180/79.2 R X |
| 3,083,533 | 4/1963 | Schenkelberger.......... 180/79.2 R X |
| 3,170,536 | 2/1965 | Van House ................ 180/79.2 R X |
| 3,279,558 | 10/1966 | Allen et al. ..................... 180/79.2 R |

Primary Examiner—David Schonberg
Assistant Examiner—John A. Pekar

[57] ABSTRACT

A hydraulic circuit comprising a power steering and a power brake, both being hydraulically connected in series to a primary pump, and a pressure priority valve for reducing the relief pressure across the power steering gear in order to prevent the back pressure imposed on the primary pump from exceeding a certain maximum pressure.

8 Claims, 5 Drawing Figures

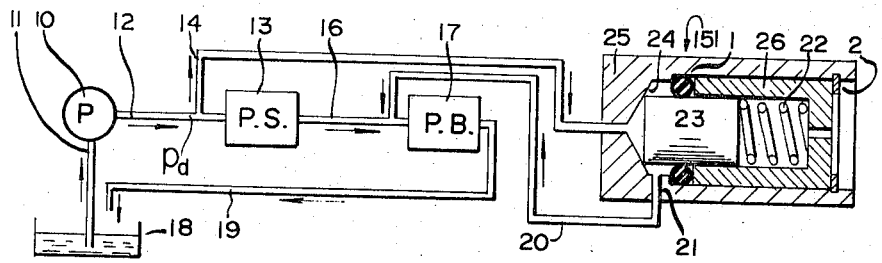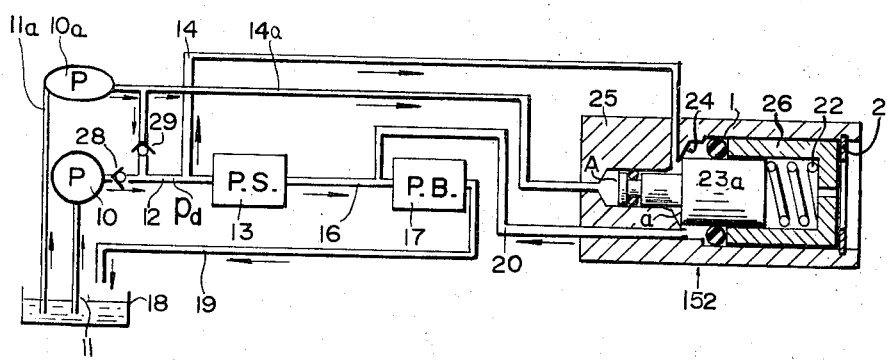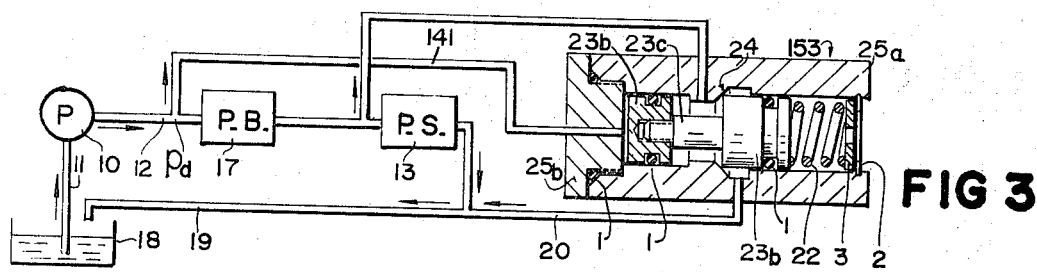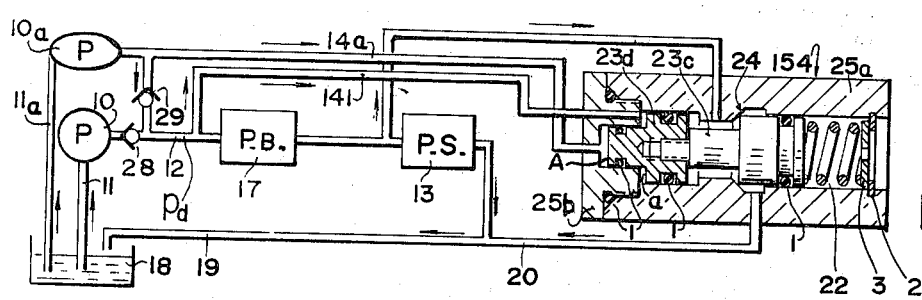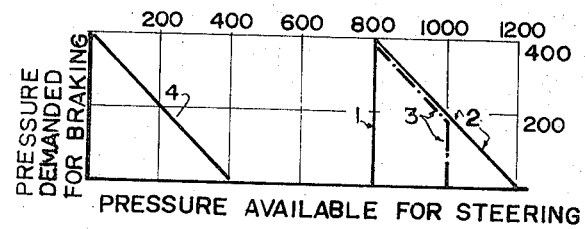

PRESSURE PRIORITY VALVE FOR A POWER STEERING AND BRAKE SYSTEM

SUMMARY AND BACKGROUND

Various designs of hydraulic circuits in which a power steering and a power brake are connected to a primary pump in series are known in the art. My copending applications titled "Hydraulic Power Brake Booster Motor" Ser. No. 80,899 filed on Oct. 15, 1970, now U.S. Pat. No. 3,751,919, and "Combined Hydraulic Power Brake and Antiskid Actuators" Ser. No. 166,399 filed on July 27, 1971, now abandoned, also show such circuits.

Usually in such circuits the pressure capability of the primary pump is divided between the power steering and the power brake by providing each unit with a pressure relief valve in parallel to it, so the sum of the relief pressures is within the primary pump's capability. Thus, each unit is assured of a certain pressure drop being available to it.

One of the improvements according to the present invention resides in replacing one of the relief valves with a pressure priority valve. The pressure priority valve allows the primary pump's full pressure capability to be utilized by one of the units if the second does not utilize any pressure, but giving preference to any pressure demand made by the second unit.

Preferably the first unit will be the power steering, and the second unit the power brake. This will assure the power brake with a pressure priority, but preferably a conventional relief valve in parallel to the power brake will limit the power brake pressure demand so sufficient pressure will remain available to the power steering. It is also possible to leave a conventional relief valve, mentioned earlier, in parallel to the power steering to prevent the power steering from utilizing full primary pump's pressure, however in such cases the sum of the relief pressures across the power steering and power brake can not exceed the primary pump's maximum pressure, since the pressure priority valve will prevent the two units from imposing on the primary pump a back pressure beyond its capability.

In some hydraulic circuits a second forced fluid flow source is provided, such as an electrically driven secondary pump. to back up the primary pump. Such an arrangement is shown in my copending application, titled "Dual Fluid Supply Circuit for a Power Steering and a Hydraulic Power Brake" Ser. No. 149,555 filed on June 3, 1971, now U.S. Pat. No. 3,762,492, which is herein incorporated by reference. Often for economical reasons this secondary back up pump has a lower maximum pressure. Thus, another object of my invention is to provide a pressure priority valve that will limit the maximum back pressure imposable by the power steering and power brake on the primary pump to a certain first maximum pressure and on a secondary pump to a certain second maximum pressure.

It may be noted that the power steering is mostly stressed during parking maneuvering. At this condition the brake is lightly stressed, therefore most of the primary pump's power output could be directed towards the power steering when a pressure priority valve according to my invention is included in the circuit. This and other objects of the invention will become apparent from the following FIGURES and the accompanying discussion.

BRIEF DESCRIPTION OF THE FIGURES

FIG. 1 shows a hydraulic circuit comprising a power steering gear and a power brake, both units being connected in series to a primary pump, with the power brake being downstream relative to the power steering gear, and a first embodiment of a pressure priority valve, for controlling the relief pressure across the power steering to prevent the sum of pressure drops ($Pd$) across the power brake and the power steering from exceeding a certain first maximum pressure.

FIG. 2 shows a hydraulic circuit similar to the one shown in FIG. 1 with the exception that a secondary pump is provided as an alternate forced fluid flow source to back the primary pump, check valves are provided to prevent cross flow between the primary and secondary pumps and second embodiment of a pressure priority valve for preventing the sum of pressure drops across the power steering gear and the power brake from exceeding a certain first maximum pressure when only the primary pump is operating, and from exceeding a certain second maximum pressure when the secondary pump is operating.

FIG. 3 shows a hydraulic circuit as in FIG. 1 with the exception that the power steering is downstream relative to the power brake and a third embodiment of a pressure priority valve, designed to function in this circuit similarly to the first embodiment.

FIG. 4 shows a hydraulic circuit as in FIG. 2 with the exception that the power steering is downstream relative to the power brake and fourth embodiment of a pressure priority valve that is designed to function in this circuit similarly to the second embodiment, and FIG. 5 graphically shows the relationship between the pressure demanded by the power brake and the pressure available for the power steering.

DETAILED DESCRIPTION OF THE FIGURES

Parts of similar nature will be given same numeral throughout the various figures.

FIG. 1 shows a first embodiment comprising a primary pump 10 having a suction line 11 and a discharge line 12 leading into a power steering gear 13. Line 12 ties into line 14 leading to a pressure priority valve generally indicated by numeral 151. Normally the fluid discharged by the primary pump 10 passes through the power steering gear 13 and continues through a line 16 into a power brake booster 17, and continues into the sump 18 through line 19. A line 20 tees from line 16 leading to the discharge port 21 of the priority valve 151.

The pressure priority valve 151 is normally closed by virtue of a preloaded spring 22 pressing a spool 23 against a conical seat 24 formed in a valve body 25. A seal 1 is backed by a sleeve 26 which is retained by a snap ring 2.

The function of the first embodiment is to reduce the relief pressure across the power steering gear 13 in order to prevent the pressure in line 12 ($Pd$) from exceeding a certain first maximum pressure. When the primary pump's discharge pressure ($Pd$) reaches the first maximum pressure the spool 23 is hydraulically pushed rightwards in sufficient force to overcome the preload of spring 22, relieving the pressure drop across the power steering gear 12 in order to prevent the pressure $Pd$ from exceeding the first maximum pressure. It may be noted that $Pd$ is the sum of pressure drops across the power steering gear 13 and the power brake booster 17 (pressure drops along the lines etc., are neglected throughout this discussion), however, the pressure drop across the brake booster 17 is unaffected by the opening of the priority valve 151. This assures that the pressure drop demanded by the brake when the sum of pressure drops across these two units reaches the first maximum pressure is given priority.

FIG. 2 shows a second embodiment 152 where the hydraulic circuit contains a second forced fluid source 10a, preferably a secondary pump. Preferably the primary pump 10 is driven by vehicle's engine, and the secondary pump 10a is electrically driven and automatically controlled (as shown in my copending application Ser. No. 149,555 which was mentioned previously) for backing up the primary pump 10 in case it fails to deliver forced fluid flow. In such an arrangement it is often preferred for economical reasons to reduce the maximum back pressure, Pd, that can be imposed on the secondary pump 10a to a certain second maximum pressure. A priority valve 152 is equipped for this purpose with a stepped spool 23a having two pressurizable areas a and A. When the primary pump 10 is supplying the forced fluid flow it passes through a check valve 28 pressurizing a line 14 and area a, but a check valve 29 prevents the primary pump 10 from pressurizing line 14a and area A. Thus, the spool 23a will not move until the multiplicity of the pressure Pd by area a is at least equal to the preload force of the spring 22. At this point Pd is equal to the first maximum pressure.

However, when the secondary pump 10a discharges pressure both area a and A are pressurized, and the spool 23a will be moved rightwards when the multiplicity of the pressure Pd by the sum of areas A and a will be larger than the spring's 22 preload. At this point Pd equals the second maximum pressure.

FIG. 3 shows a third embodiment of a priority valve 153. The primary pump's discharge pressure Pd is sensed by a spool made of two parts 23b and 23c bolted together, through a line 141. When the pressure Pd tends to rise above the first maximum pressure the spool is hydraulically pushed righwards overcoming the preload of the spring 22, which is supported at its other end by a washer 3 and a retaining ring 2, relieving thereby the pressure drop across the power steering gear 13, thereby preventing further rise of primary pump's 10 discharge pressure Pd. A valve body 25a has a cover 25b to enable the assembly of the spool inside the valve body.

FIG. 4 shows a fourth embodiment 154 where the hydraulic circuit contains a secondary forced fluid flow pump 10a, a stepped spool made of two parts 23c and 23d defining two areas a and A. Similarly to the arrangement explained in FIG. 2, normally when the primary pump 10 is operative and the secondary pump 10a is not, only area a is pressurized, and the pressure Pd is limited to the first maximum pressure. If the secondary pump 10a becomes operative, both areas a and A are pressurized and the pressure prevailing in line 12, Pd is limited to a certain second maximum pressure.

FIG. 5 shows the relationships between the pressure demanded by the power brake (vertical scale) and the pressure available for steering (horizontal scale).

To illustrate the relationship the following numerical values have been choosen; the first maximum pressure is 1,200 psi, the maximum pressure that can be demanded by the power brake is 400 psi.

Line 1 shows for reference the relationship when an ordinary relief valve is used in parallel to the power steering. The relief valve has to be set at no more than 800 psi relief pressure to prevent the sum of pressure drops across the power steering and power brake from exceeding 1,200 psi.

Line 2 shows the relationship when a priority valve is used instead of the relief valve.

Line 3 shows the relationship when a priority valve and a relief valve are both used in parallel to the power steering. The relief pressure of the relief valve is set at a 1,000 psi to prevent a higher pressure drop across the power steering. The pressure priority valve assures that the sum of pressure drops across both units will not exceed 1,200 psi.

Line 4 shows the relationship when a second pump becomes operative and the pressure priority valves switches to a second maximum pressure (line 4 refers to FIGS. 2 and 4).

I claim:

1. A hydraulic circuit comprising a power steering gear and a power brake, both units being connected in series to a primary pump for circulating fluid through said units, and a pressure priority valve for controlling the relief pressure across the power steering for preventing the sum of pressure drops across the power steerig gear and the power brake from exceeding a certain maximum pressure which is within said primary pump's capability, thereby giving priority to the pressure demanded by the power brake over pressure demanded by the power steering.

2. A hydraulic circuit as in claim 1 where said power steering gear is hydraulically connected up stream relative to said power brake.

3. A hydraulic circuit as in claim 1 where said power steering is hydraulically connected down stream relative to said power brake.

4. A hydraulic circuit as in claim 1 where a relief valve is provided in parallel to the power brake for limiting the pressure drop across said power brake.

5. A hydraulic circuit as in claim 4 where a relief valve is provided in parallel to the power steering gear for limiting the pressure drop across said power steering gear.

6. A hydraulic circuit comprising a power steering gear and a power brake, both units being connected in series to a primary pump for normally circulating fluid through said units and to a secondary pump for alternatively circulating fluid through said units and check valve means for preventing cross flow between said pumps, the improvement wherein a pressure priority valve is hydraulically connected in parallel to said power steering gear and to said pumps for preventing the sum of pressure drops across said units from exceeding a certain first maximum pressure which is within said primary pump's capability when only the primary pump is operating, and from exceeding a certain second maximum pressure which is within said secondary pump's capability when the secondary pump is operating.

7. A hydraulic circuit as in claim 6 where said power steering gear is hydraulically connected up stream relative to said power brake.

8. A hydraulic circuit as in claim 6 where said power steering is hydraulically connected down stream relative to said power brake.

* * * * *